(12) United States Patent
Wu et al.

(10) Patent No.: US 6,358,434 B1
(45) Date of Patent: Mar. 19, 2002

(54) BLOWING AGENT BLENDS

(75) Inventors: Jinhuang Wu; Douglas R. Dillon, both of Norristown; Richard M. Crooker, Fogelsville, all of PA (US)

(73) Assignee: ATO FINA Chemicals, Inc., Philadelphia, PA (US)

( * ) Notice: Subject to any disclaimer, the term of this patent is extended or adjusted under 35 U.S.C. 154(b) by 0 days.

(21) Appl. No.: 09/861,731

(22) Filed: May 21, 2001

(51) Int. Cl.⁷ ................................................ C09K 3/00
(52) U.S. Cl. ................ 252/182.24; 510/407; 510/408; 510/412; 510/415
(58) Field of Search ...................... 252/182.24; 510/407, 510/408, 412, 415

(56) References Cited

U.S. PATENT DOCUMENTS

| | | | | |
|---|---|---|---|---|
| 5,759,438 A | * | 6/1998 | Lund et al. ............. | 252/182.24 |
| 5,874,657 A | * | 2/1999 | Miller et al. ................. | 570/178 |
| 6,117,914 A | * | 9/2000 | Wu .............................. | 521/131 |
| 6,225,364 B1 | * | 5/2001 | Chaudhary et al. ......... | 521/131 |
| 6,288,135 B1 | * | 9/2001 | Bement et al. ............. | 521/174 |
| 6,303,667 B1 | * | 10/2001 | Kruecke ..................... | 521/131 |

\* cited by examiner

*Primary Examiner*—John M. Cooney, Jr.
(74) *Attorney, Agent, or Firm*—William D. Mitchell

(57) ABSTRACT

Foam blowing agent blends of D11 and a pentane are provided, as are polyol premixes containing such blends. The resulting foams exhibit dramatic improvement in fire resistance.

6 Claims, No Drawings

BLOWING AGENT BLENDS

BACKGROUND OF THE INVENTION

This invention relates to foam blowing agent blends of (a) 1,1-dichloroethane ("D11") with (b) n-pentane ("n-C5"), i-pentane ("i-C5"), cyclopentane (c-C5) or an i-C5/c-C5mixture, and to polyol premixes containing such blends. The foam blowing agent blends are particularly useful for making closed cell polymer (insulation) foams having improved fire resistance, such as polystyrene, phenolic and polyurethane foams.

Chlorofluorocarbons ("CFCs") had been used as blowing agents for rigid, closed cell insulation foams for many years because they offer outstanding fire resistance in addition to good thermal insulation. However, CFCs have been phased out because they are said to be detrimental to the ozone layer. Zero ozone depletion alternatives such as pentanes have been identified, but pentanes are highly flammable and their resulting foams suffer undesirable fire performance properties. It is increasingly difficult for pentane blown foams to meet stringent fire performance requirements, so that yet another alternative with better fire resistance performance is desirable.

BRIEF SUMMARY OF THE INVENTION

Foam blowing agent compositions are provided, which compositions comprise D11 and a pentane selected from the group consisting of n-C5, i-C5, c-C5 and an i-C5/c-C5 mixture (preferably as an equimolar mixture), as well as foam premix compositions comprising a polyol and the blowing agent composition.

DETAILED DESCRIPTION

It has now been found that the foregoing blends of pentanes with D11 dramatically improves fire resistance of pentane blown foams even though D11 itself is flammable. As noted above, these blends are particularly useful for making closed cell polymer (insulation) foams having improved fire resistance, such as polystyrene, phenolic and polyurethane foams.

D11 generally makes up greater than 10 mole % of the blends, preferably 25 to 50 mole %. A practical upper limit on the amount of D11 is about 60–70 mole %. At the preferred levels of D11, improvements also occur in k-factor (and thus insulation) performance.

In the premix compositions the blowing agent blend is typically present in a concentration range of about 2–60 weight % (preferably 5–40 weight %), based on the weight of the polyol.

In polyurethane foam compositions, the effective concentrations of the blends are typically about 0.1–25 weight % (preferably 0.5–15 weight %), based on the weight of the total polyurethane foam formulation.

The blowing agent can be distributed between the "A" and "B" sides of the foam composition. All or a portion of it can also be added at the time of injection.

The other components of the premix and foam formulations may be those which are conventionally used, which components and their proportions are well known to those skilled in the art. For example, fire retardants, surfactants and polyol are typical components of the B-side, while the A-side is primarily comprised of the polyisocyanate. Water is frequently used as a coblowing agent. The A and B sides are typically mixed together, followed by injection of the catalyst, after which the mixture is poured into a mold or box.

The practice of the invention is illustrated in more detail in the following non-limiting examples. The formulations used (all having an Iso Index of 300) each contained 170.51 parts M-489, a polymeric methane diphenyl diisocyanate available from Bayer Corporation; 100 parts PS2352, a polyester polyol having a hydroxyl number of 230–250 available from the Stepan Company; 0.16 part PC-5 and 0.29 part PC-46, which are, respectively, pentamethyldiethylenetriamine and potassium acetate in ethylene glycol, catalysts available from Air Products; 2.57 parts K-15, potassium octoate in dipropylene glycol, a catalyst available from Air Products; 2 parts B-8462, a polysiloxane-polyether copolymer surfactant available from Goldschmidt Chemical Corporation; 10 parts AB-80, a tris(1-chloro-2-propyl) phosphate fire retardant available from Rhodia, Inc; and about 21–26 parts blowing agents, the exact amounts of which are more particularly set forth below in Tables I and II below; all parts are by weight.

TABLE I

Parts of Blowing Agent in Comparative Examples:

| | | | | |
|---|---|---|---|---|
| i-C5: | 22.31 | 11.16 | — | — |
| c-C5: | — | 10.85 | 21.70 | — |
| n-C5: | — | — | — | 22.32 |

TABLE II

Parts & Mole % (of D11) of Blowing Agent in Invention Examples

| | | | | | | |
|---|---|---|---|---|---|---|
| c-C5 | 19.53 | 16.28 | 10.85 | — | 5.43 | — |
| i-C5 | — | — | — | 11.16 | 5.58 | — |
| n-C5 | — | — | — | — | — | 11.16 |
| D11 parts | 3.07 | 7.67 | 15.35 | 15.35 | 15.35 | 15.35 |
| D11 Mole % | 10 | 25 | 50 | 50 | 50 | 50 |

The A-side (M489) and B-side (a mixture of the polyol, surfactant, fire retardant and blowing agents) were each cooled to 10° C., then mixed, after which the catalyst mixture was injected. After further mixing for about 15–18 seconds, the mixture was poured into a box. A Mobil 45 fire resistance performance test was then performed on samples of the resulting foams. In this test samples are weighed before and after exposure to a burner and the weight loss percentage is calculated. The less the weight loss, the better the fire performance. The results are shown in Table III:

TABLE III

Mobil 45 Fire Resistance Weight Loss % Results:

| | |
|---|---|
| c-C5 alone: | 9.8% |
| c-C5 with 10 mole % D11: | 9.3% |
| c-C5 with 25 mole % D11: | 5.5% |
| c-C5 with 50 mole % D11: | 2.6% |
| c-C5/i-C5 alone | 8.8% |
| c-C5/i-C5 with 50 mole % D11: | 2.2% |
| n-C5 alone | 9.1% |
| n-C5 with 50 mole % D11: | 2.5% |
| i-C5 alone | 8.5% |
| i-C5 with 50 mole % D11: | 2.8% |

What is claimed is:

1. A foam blowing agent composition comprising 1,1-dichloroethane and a pentane selected from the group consisting of n-pentane, i-pentane, cyclopentane and an i-pentane/cyclopentane blend.

2. A foam blowing agent composition comprising 1,1-dichloroethane and a pentane selected from the group consisting of n-pentane, i-pentane, cyclopentane and an i-pentane/cyclopentane blend wherein the 1,1-dichloroethane makes up more than 10 mole % of the foam blowing agent composition.

3. A foam blowing agent composition comprising 1,1-dichloroethane and a pentane selected from the group consisting of n-pentane, i-pentane, cyclopentane and an i-pentane/cyclopentane blend wherein the 1,1-dichloroethane makes up 25 to 50 mole % of the foam blowing agent composition.

4. A foam premix composition comprising a polyol and the foam blowing agent composition of claim 1.

5. A foam premix composition comprising a polyol and the foam blowing agent composition of claim 2.

6. A foam premix composition comprising a polyol and the foam blowing agent composition of claim 3.

* * * * *